R. STAFIEJ.
REPAIRING DEVICE FOR BICYCLE TIRES.
APPLICATION FILED JAN. 21, 1921.
1,385,591.
Patented July 26, 1921.
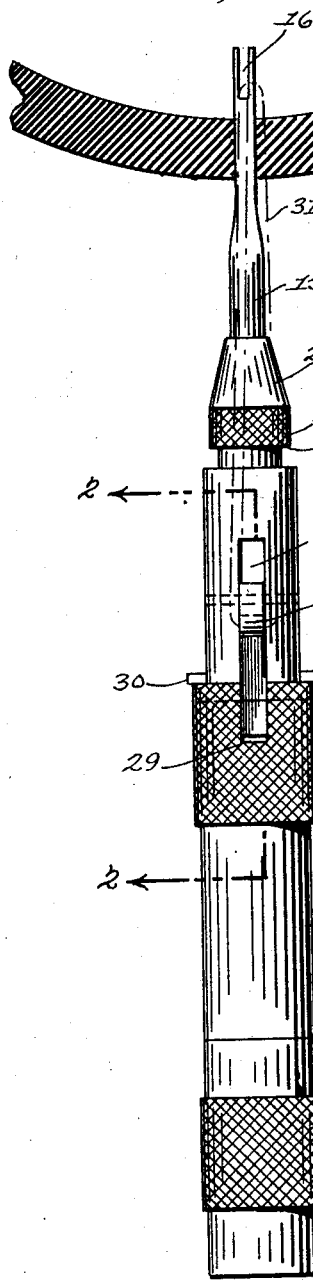
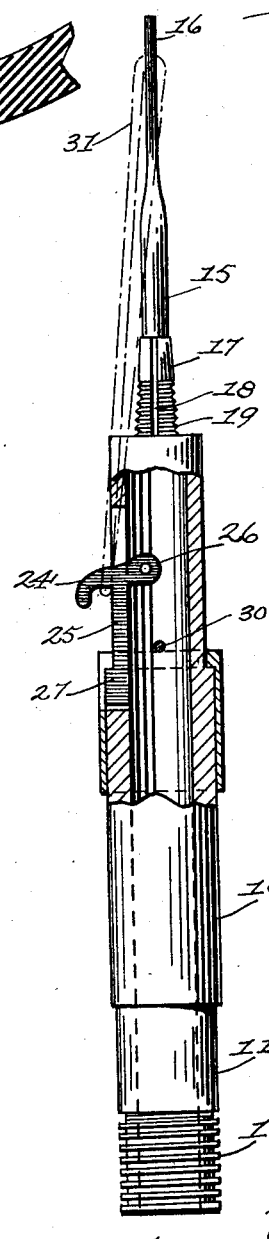
Inventor
Roman Stafiej
By his Attorney

UNITED STATES PATENT OFFICE.

ROMAN STAFIEJ, OF DETROIT, MICHIGAN.

REPAIRING DEVICE FOR BICYCLE-TIRES.

1,385,591. Specification of Letters Patent. Patented July 26, 1921.

Application filed January 21, 1921. Serial No. 438,873.

*To all whom it may concern:*

Be it known that I, ROMAN STAFIEJ, a citizen of Poland, residing at Detroit, county of Wayne, and State of Michigan, have invented certain new and useful Improvements in Repairing Devices for Bicycle-Tires, of which the following is a specification.

This invention relates to improvements in tire repairing tools, and it is the principal object of the invention to provide a tool of this character by means of which small punctures in the tires can be repaired instantaneously without the necessity of removing the tire from the rim.

A further object of the invention is to provide a simple, durable and inexpensive tool of this character capable of closing a puncture of a tire in a moment.

The invention consists in a certain novel construction and arrangement of parts of the tool for service, fully set forth hereinafter, and specifically pointed out in the appended claims.

In the accompanying drawing the same reference numerals indicate the same parts of the invention in all of the views.

In this drawing—

Figure 1 shows the tool constructed according to the present invention in front view, and Fig. 2 is a side view thereof, the view being taken along line 2—2 of Fig. 1.

The tool comprises a hollow, cylindrical body member 10, preferably made of steel, reduced at its lower end as at 11 and provided with outer screw-thread 12 for the reception of a cap 13 having an inner screw-threaded part to engage the thread 12 and an outer milled band 14.

The chamber within the body which is closed by the cap 13 constitutes a receptacle or reservoir for the reception of a plurality of needles 15 provided with a fork 16 at their upper ends, which are of different sizes, to accommodate various puncture holes, and capable of being introduced with their lower offset ends into a sleeve 17 integrally made with the body 10 and longitudinally slotted as at 18 and provided with the exterior screw-thread 19.

A sleeve 20 provided with an upper conical part 21 and a lower exteriorly milled part 22 has an inner threaded part adapted to engage the thread 19 and is set off at its lower end to snugly fit into a corresponding circular groove at the upper end of the body 10.

Intermediate its ends the body 10 is provided with a longitudinal slot 23 through which the hooked part 24 of a T-shaped member 25 projects which is pivoted to the inner wall of the cylindrical hollow body 10, as at 26 at the end of the T-bar opposite to its hooked part, so that the lower part of the member 25 which is provided with a shoulder 27 can freely swing out and into the slot 23.

A milled sleeve nut 28 provided with a longitudinal slot 29 at its upper end is rotatably secured to the body 10, and stops 30 on said body limit its upward movement. It will be clear that when the sleeve 28 is rotated so as to bring its slot out of alinement with the slot 23, it will prevent a swinging of the member 25 out of the body 10 through said slot.

When now a rubber or other elastic band 31 is placed with its upper end between the prongs of the fork 16 and with its lower end around the hook 24, it will have the tendency of swinging the member 25 around the pivot 26. If the sleeve 28 is now rotated so as to bring its slot 29 in alinement with the slot 23, after the forked end 16 of the tool is introduced into a puncture hole in a tire 32 as indicated in Fig. 1, the member 25 will act as a trigger and upon its release by the sleeve 28 will catapult the rubber band 31 into said hole to close the same.

In order to secure an additional closure a drop of liquid rubber or any other suitable cement brought upon the outer end of the rubber 31 in the puncture hole will be sufficient to close the puncture.

It will be clear that changes may be made in the general arrangement and the construction of the minor details of my invention without deviating from the scope and spirit thereof as indicated in the appended claims.

Having thus described my invention what I claim as new and desire to secure by Letters Patent of the United States is,—

1. A tool of the character described comprising a hollow cylindrical body, having a longitudinal slot, a forked needle removably secured to the upper end of said body and adapted to engage a tire through a puncture hole, a T-shaped trigger pivotally secured in said body and adapted to be swung out of the same through its longitudinal slot, a hooked end on said trigger normally protruding through said longitudinal slot and adapted to receive a rubber band guided over the fork of said needle, a milled sleeve having a longitudinal slot near its upper end for normally locking the trigger and to release the same when the slots in said body and said sleeve are brought into alinement in order to catapult said rubber band into the puncture hole.

2. In a tool of the character described, the combination of a hollow cylindrical steel body having a longitudinal slot intermediate its ends, a forked needle removably secured to the upper end of said body, a reservoir at the lower end of said body for the reception of a number of assorted needles, a T-shaped trigger rotatably secured at one end of its upper bar within said hollow body, a hook at the opposite end of said T-bar normally protruding through the slot in said body adapted to engage a rubber band guided between the prongs of said fork, a lower shoulder on said trigger, a milled sleeve on said body having a longitudinal slot in its upper edge, said sleeve normally engaging said shoulder and adapted to release said trigger when its slot is in alinement with the slot in said body for catapulting said rubber band into a puncture hole.

3. In a tool of the character described, the combination, of a hollow cylindrical body having a longitudinal slot, with a screw-threaded and slotted nipple upon the upper end of said body adapted to receive the offset lower end of a forked needle, an interiorly screw-threaded cap having a conical upper part adapted to be screwed upon said nipple, a means for catapulting a rubber band into a tire puncture hole upon the introduction of the forked needle into the same, and a means for storing auxiliary needles in the lower end of said body.

In testimony whereof I have affixed my signature.

ROMAN STAFIEJ.